UNITED STATES PATENT OFFICE.

HIRAM L. JOSLIN, OF EUREKA SPRINGS, ARKANSAS.

SPRAYING DEVICE.

No. 815,713.  Specification of Letters Patent.  Patented March 20, 1906.

Application filed August 28, 1905. Serial No. 276,110.

*To all whom it may concern:*

Be it known that I, HIRAM L. JOSLIN, a citizen of the United States, residing at Eureka Springs, in the county of Carroll and State of Arkansas, have invented certain new and useful Improvements in Spraying Devices; and I do declare the following to be a full, clear, and exact description of the invention, such as will enable others skilled in the art to which it appertains to make and use the same.

This invention relates to improvements in spraying devices.

The object of the invention is to provide a device of this character by which steam, hot or cold water, or other liquids may be sprayed for the purpose of destroying insects or for fumigating and disinfecting purposes.

A further object is to provide means for readily transporting the device from one place to another.

With the above and other objects in view the invention consists of certain novel features of construction, combination, and arrangement of parts, as will be hereinafter described and claimed.

Figure 1:
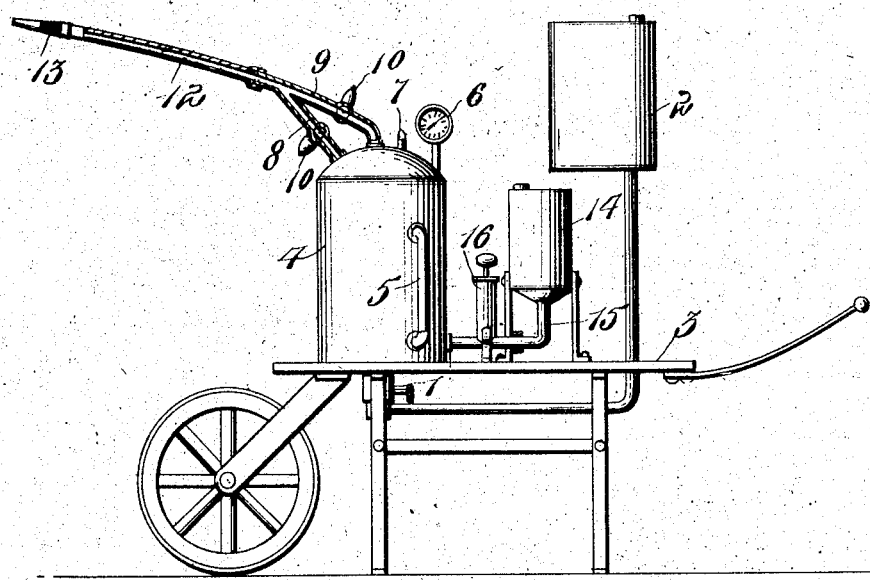
Figure 2:
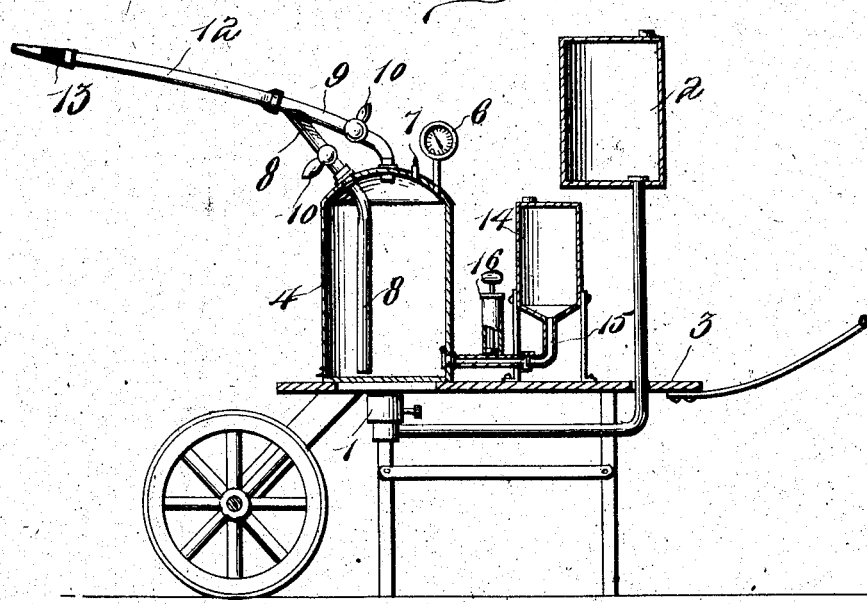

In the accompanying drawings, Figure 1 is a side elevation with parts in section of a spraying device constructed in accordance with the invention, and Fig. 2 is a vertical longitudinal sectional view through the same.

Referring more particularly to the drawings, 1 denotes a heating apparatus which may be of any suitable construction, but which is here shown and is preferably in the form of a vapor-stove. The stove 1 is provided with the usual oil or gasolene reservoir 2 and is adapted to be supported upon a suitable wheeled truck 3, said truck being provided with handles by which the same may be conveniently pushed or pulled.

Adapted to be supported upon the stove 1 over the burner of the same is a main heating-tank 4, said tank being provided with a water-glass 5, a steam-gage 6, and a blow-off or safety valve 7. Connected to the tank 4 is a water-discharge pipe 8, which extends into the tank to near the bottom of the same and a steam-discharge pipe 9, which is connected with the upper end of the tank. The pipes 8 and 9 are provided with cut-off valves 10, and beyond said valves the pipes are brought together and join into one pipe. To the connected ends of the pipes 8 and 9 is adapted to be removably attached a flexible discharge-pipe 12, on the outer end of which is arranged a spray-nozzle 13.

Connected to the tank 4 is an auxiliary tank 14, said tank being provided at its lower end with a discharge-pipe 15, which communicates with the lower end of the tank 4, and connected with said discharge-pipe is a pump 16 by which the liquid contained in the auxiliary tank may be forced into the main tank, as will be understood. By means of the auxiliary tank 14 a greater supply of water may be carried, or, if desired, suitable chemicals may be placed into the tank 14 and from the same forced into the tank 4 and mixed with the water contained therein, thus enabling the device to be used for spraying various kinds of disinfecting or deodorizing preparations.

By the arrangement of the pipes 8 and 9 and the valves arranged therein either water or steam may be projected from the tank 4, the water or other liquid in said tank being quickly heated by means of the stove or heating apparatus 1, and when sufficient pressure has been obtained in the tank by the heating of the liquid therein one or both of the valves 10 may be opened, thus causing water or steam, or both, to be forced out of the discharge-pipe 12, as may be desired. If it should be desired to use the device for spraying unheated liquids, the same may be forced from the tank 4 by means of the pump 16.

A device of this character may be used for spraying trees or plants to destroy the insects thereon or may be used for spraying disinfecting and deodorizing preparations or for spraying hot or cold water or steam wherever the same may be desired.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a spraying device, the combination with a heating apparatus, of a main tank adapted to be placed on said heating device, a valved water-discharge pipe and a valved steam-discharge pipe arranged in said tank, an auxiliary tank connected to said main tank, and means whereby the liquid in said auxiliary tank is pumped into said main tank, substantially as described.

2. In a spraying device, the combination with a heating apparatus, of a main tank adapted to be placed on said heating device, a valved water-discharge pipe and a valved steam-discharge pipe arranged in said tank, said pipes being connected beyond said valves, a single discharge-pipe adapted to be joined with said connected pipes, a discharge-nozzle arranged on said single discharge-pipe, an auxiliary tank connected to said main tank, and a pump whereby the liquid in said auxiliary tank may be forced into said main tank, substantially as described.

3. In a spraying device, the combination with a wheeled truck, of a heating apparatus arranged thereon, a tank adapted to be placed on said heating apparatus, a water-discharge pipe arranged in said tank and extending to near the bottom of the same, a steam-discharge pipe connected with the upper end of said tank, valves arranged in said pipes, means whereby the latter are joined to form one pipe, a flexible discharge-pipe connected to said joined pipes, a nozzle arranged on said flexible pipe, a water-glass, a steam-gage and a safety-valve arranged on said main tank, an auxiliary tank, connected to said main tank, and a pump whereby the liquid in said auxiliary tank is forced into said main tank, substantially as described.

In testimony whereof I have hereunto set my hand in presence of two subscribing witnesses.

HIRAM L. JOSLIN.

Witnesses:
   JOHN B. PENDERGRASS.
   SAMUEL E. HAYS.